United States Patent [19]

De Santis

[11] 3,779,794

[45] Dec. 18, 1973

[54] POLYURETHANE SEALANT-PRIMER SYSTEM

[75] Inventor: G. William De Santis, East Brunswick, N.J.

[73] Assignee: Essex Chemical Corporation, Clifton, N.J.

[22] Filed: Jan. 31, 1972

[21] Appl. No.: 222,398

Related U.S. Application Data

[62] Division of Ser. No. 16,924, March 5, 1970, Pat. No. 3,707,521.

[52] U.S. Cl................. 117/72, 117/75, 117/124 E, 117/132 BS, 117/DIG. 7, 156/329, 156/331, 161/190, 161/219, 260/37 N
[51] Int. Cl............................................. B32b 27/40
[58] Field of Search............ 117/72, DIG. 7, 161 KP

[56] References Cited
UNITED STATES PATENTS

| 3,453,136 | 7/1969 | Bylsma | 117/72 |
|---|---|---|---|
| 3,453,243 | 7/1969 | Hartlein | 117/72 X |
| 3,246,671 | 4/1966 | Stein et al. | 117/72 X |
| 3,309,261 | 3/1967 | Schiller et al. | 260/37 N X |
| 3,437,622 | 4/1969 | Dahl | 260/33.6 UB |
| 3,454,533 | 7/1969 | Kerrigan | 260/33.6 UB |
| 3,380,950 | 4/1968 | Blomeyer | 260/32.8 N X |
| 3,012,984 | 12/1961 | Hudson | 260/31.4 R X |
| 3,391,054 | 7/1968 | Lewis et al. | 260/37 N X |

Primary Examiner—Ralph Husack
Attorney—Donald R. Bentz

[57] ABSTRACT

Polyurethane sealant-primer system comprising an isocyanate-reactive surface primer composition and a moisture-curable polyurethane sealant composition; method of making cured polyurethane seals with said system; cured polyurethane seals produced thereby.

2 Claims, No Drawings

POLYURETHANE SEALANT-PRIMER SYSTEM

This is a division of application Ser. No. 16924, filed Mar. 5, 1970, now U. S. Pat. No. 3,707,521 granted Dec. 26, 1972.

The present invention relates to a moisture-curable polyurethane sealant-primer system, to primer compositions for use in said polyurethane sealant-primer system, to methods of forming cured polyurethane seals, and to the cured polyurethane seals so produced.

The moisture-curable polyurethane sealant-primer systems of the present invention are useful as sealing, caulking, and patching compositions, and as adhesives. Because of their properties, the systems are of particular interest for the mounting of glass, for example in the construction of glass-wall buildings and in the automotive industry for the mounting of windshields, rear windows, and taillights.

In the past, polysulfide compositions have been widely used for mounting glass panes, windshields, and the like. Such polysulfide compositions must be admixed with a curing agent just prior to use. The activated mixture has a limited pot-life.

The prior art system has the disadvantage that separate inventories of the uncatalyzed composition and catalyst must be kept. Also, mixing apparatus for the composition and catalyst must be installed, supervised, cleaned, and maintained, all at considerable cost.

In contrast, the polyurethane sealant-primer systems of the present invention do not require the addition of any curing agent prior to use, but are cured by atmospheric moisture after application. No catalyst need be inventoried, no mixing operations are involved, and supply and demand can be readily correlated because there are no pot-life problems. Further, the physical properties of the cured polyurethane systems, for example strength in tensile and shear tests, are significantly superior to those of the polysulfides now in use.

Although the polyurethane sealant component of the sealant-primer systems of the present invention adheres when applied directly to many surfaces, particularly good bonds are formed between the sealant and a surface such as glass if the glass is first primed with a primer composition hereinafter disclosed. The sealant-primer systems of the present invention meet the high standards set by the automotive industry for fast adhesion, moisture resistance, and resistance to ultraviolet light when used as sealants for the mounting of the windshield and other glass surfaces in an automobile chassis.

Thus, for example, certain primers disclosed in the present application will meet the requirement of the automotive industry that they dry on a glass surface in less than 5 minutes.

When certain polyurethane sealants disclosed herein are used with such primers, a seal having a tensile strength of 40 pounds psi is developed within 6 hours at room temperature and at 50 percent relative humidity. Thus, a sufficiently strong bond is formed before the seal may be exposed to lower temperatures possibly inhibiting further curing.

Further, certain seals made according to the present invention will withstand extreme conditions of moisture. For example, they can be exposed to 100 percent humidity at 100° F. for 7 days without any loss of adhesion.

Finally, a very important requirement satisfied by the sealant-primer systems of the present invention is that the seals be highly resistant to ultraviolet light. For example, the new seals show no significant loss of adhesion after exposure to ultraviolet light for 300 hours in a twin-carbon arc fadeometer at a black panel temperature of 190° F.

The new seals according to the present invention also pass a wide variety of other environmental tests.

The polyurethane sealant component of the sealant-primer systems of the present invention consists essentially of a branched polyurethane polymer in combination with a latent catalyst for the moisture-curing of free isocyanate groups present in the polymer, together with inert fillers, plasticizers, and extenders in balanced amounts imparting desirable rheological properties to the composition.

The polyurethane component of the sealant compositions is prepared by the reaction of a polyalkylene ether diol and a polyalkylene ether triol with an excess of diisocyanate to form a branched polymer having a slight excess of free isocyanate groups. The polyalkylene ether diols employed in the preparation of the polyurethane polymer are suitably poly(lower alkylene) glycols such as polyethylene glycol or polypropylene glycol. They are commonly prepared by the condensation of polyethylene oxide or polypropylene oxide with a lower alkylene diol such as ethylene glycol or propylene glycol. Those polyalkylene ether diols having a molecular weight of from 1,500 to 3,000, preferably from 2,000 to 2,500, are preferred.

The polyalkylene ether triols used in the formulation of the polyurethane polymer are commonly prepared by condensing a lower alkylene oxide such as ethylene oxide or propylene oxide with an alkylene triol such as glycerine, trimethylol propane, or the like. These polymers suitably have a molecular weight of from 3,500 to 5,500, preferably from about 4,200 to 4,800.

The choice of diisocyanate reacted with these materials is one which is important to the invention. Thus, although toluene diisocyanate is widely used in the art for the manufacture of polyurethane compositions, this material has been found unsuitable for the manufacture of the moisture-curable sealant compositions of the present invention. The isocyanate groups of toluene diisocyanate are respectively ortho and para to the methyl group, and are not sterically equivalent. It is believed that this lack of equivalence in the isocyanate groups causes a non-uniform release of carbon dioxide on moisture-curing, with the result that bubbles form in the compositions and produce undesirable weakened structures.

In the present invention, polyisocyanates having equivalent isocyanate groups are employed. The resultant formation of substantially bubble-free cured seals is attributed to a uniform curing reaction involving a controlled release of carbon dioxide. Both aliphatic and aromatic compounds having equivalent isocyanate groups can be used, but aromatic polyisocyanates are preferred because of their faster reaction rate. Thus, a compound such as hexamethylene diisocyanate can be employed, but the preferred material is diphenyl methane-4,4'-diisocyanate.

The polyurethanes used in the present invention are suitably prepared by first reacting an excess of a diisocyanate having equivalent isocyanate groups, such as diphenyl methane-4,4'-diisocyanate, with a polyalkylene ether diol to form a product substantially free of hydroxyl groups and having from about 3 to 4 percent, preferably from about 3.3 to 3.7 percent, by weight of free isocyanate groups. This prepolymer is then further reacted with a polyalkylene ether triol to form a branched polyurethane substantially free of hydroxyl groups and which still contains from about 1 to 2 percent, preferably from about 1.2 to 1.5 percent, by weight of free isocyanate groups.

To minimize the evolution of carbon dioxide when this polyurethane polymer is cured, the free isocyanate content is kept low. Because of this low content of free isocyanate in the product, it is important that moisture be excluded during processing and storage to assure stability of the product. Thus, the diisocyanate and hydroxylic reagents are reacted in a dry inert atmosphere such as of dry nitrogen, suitably in the presence of a catalyst. Catalysts for this reaction are well known in the art and include numerous organometallic compounds such as heavy metal carboxylates (e.g., dibutyl tin dilaurate, stannous octoate, lead octoate, mercuric succinate), as well as amines and the ferric complex of acetoacetic ester. Catalytic amounts of these materials are employed, generally ranging from 0.001 to 3 parts per 100 parts by weight of the polyurethane polymer, depending on the catalyst.

To further encourage stability in the final product and to discourage the formation of allophanate linkages by reaction of the isocyanate groups with each other, the free isocyanate groups of the polyurethane polymer are suitably blocked. Blocking is known in the art and involves the reversible reaction of isocyanate groups with a labile reagent which is displaced by the curing agent on curing. For the polyurethanes of the present invention, which are to be cured at room temperature or above, blocking agents which are relatively volatile at room temperature are conventionally employed. These materials, which are compounds capable of tautomerization to form species having an –OH group, include substances such as ethyl acetoacetate, isophorone, acetone, and methyl-ethyl-ketone, for example. A particularly useful group of blocking agents are those dialkyl malonates having from one to four carbon atoms in each alkyl radical, i.e., di(lower alkyl) malonates such as dimethyl malonate, diethyl malonate, methyl-ethyl malonate, etc. According to the invention, an excess of a blocking agent of this type (e.g., up to 10 parts per 100 parts by weight of polyurethane polymer) is reacted with the polyurethane polymer after formation to block the free isocyanate groups therein.

When the sealant-primer systems of the invention are employed, e.g., by spreading on a surface so that they are exposed to atmospheric moisture at room temperature or above, the volatile blocking agent reversibly separates from the isocyanate groups in the sealant component, which then react with atmospheric moisture in a curing reaction.

The sealant component of the sealant-primer systems of the invention contains a catalyst for this moisture curing reaction. A variety of catalysts suitable for isocyanate reactions have been discussed above in connection with the isocyanate-polyol reaction. The same materials can be incorporated into a sealant to promote the moisture-curing reaction. These catalysts, which will be defined herein as catalysts promoting "isocyanate curing reactions," should be understood to be those which promote the reaction of an isocyanate group with any active hydrogen atoms, such as those supplied by water, amines, hydroxy compounds, etc. Although a variety of catalysts can be used in the compositions of the invention, di(phenylmercuric)dodecenyl succinate has proved to be particularly good. Amines cure most rapidly, but may adversely affect the stability of the rheological properties of compositions in which they are present.

To formulate sealant compositions, a blocked polyurethane polymer and catalyst are suitably combined with inert fillers, plasticizers, and solvents in balanced amounts to impart desired rheological and other physical properties to the resultant mixture. Clays, silica, silicates, and other inert fillers can be employed, but the filler most commonly used in the compositions of the present invention is carbon black. Carbon black is of particular utility because of its ultraviolet absorbing properties. This makes it desirable as a filler in compositions to be employed for mounting windshields, for example, or elsewhere where resistance to ultraviolet light is a requirement. A variety of conventional plasticizers and/or extenders (solvents) can be employed to regulate the viscosity of the compositions. The materials should be inert to isocyanate groups, free of water, and compatible with the polymer component. Suitable plasticizers include dioctyl phthalate, tricresyl phosphate, dibutyl phthalate, diisodecyl phthalate, a partially hydrogenated terpene commercially available under the tradename "HB-40," and chlorinated biphenyls such as are commercially available under the tradenames "Aroclor 1242," "Aroclor 1254," and "Aroclor 1260." Toluene or xylene are commonly used as solvents or extenders, but other isocyanate-inert solvents, aromatic or non-aromatic, hydrocarbon or non-hydrocarbon can be used, such as methyl ethyl ketone, acetone, ethyl acetate, or cellosolve acetate.

Fillers such as carbon black are suitably employed in amounts up to 135 parts per 100 parts by weight of polyurethane polymer. Furnace black, thermal black, or, preferably, mixtures of furnace and thermal black can be used, for instance. Since the fillers, particularly carbon black, may contain adsorbed moisture which could deleteriously affect the isocyanate content of the sealant, it is important that the fillers be dried thoroughly before incorporation into the sealant composition. Plasticizers and extenders may be incorporated into the compositions in amounts up to 20 parts per 100 parts by weight of urethane prepolymer.

The relative amounts of filler, plasticizer, and solvent employed in formulating the compositions are such, within the limits set forth above, that the resultant composition has the rheological properties desired by the formulator. Thus, for windshields, glass panes, and other objects which are generally mounted in a vertical position, it is desirable that the sealant composition have a viscosity precluding sag or flow under the influence of gravity after application to a vertical surface. It is within the skill of the art to combine such amounts of filler, plasticizer, and solvent in combination with the polyurethane prepolymer to impart the desired rheological properties to the composition. Evidently, to thin the compositions more plasticizer and reducer are employed relative to the amount of prepolymer and filler, and vice versa if more viscous compositions are desired.

The final product, after thorough blending, is discharged into containers which are sealed to be moisture-proof. For use, the containers are opened and the polyurethane composition is simply applied to the surface to be sealed. Under the influence of atmospheric moisture, curing occurs at room temperature in a few hours.

Although the sealants described above can be directly applied and will adhere to certain surfaces, priming a surface with an isocyanate-reactive material gives the best adherence, as well as improving other properties of the bond formed. As discussed earlier, this is particularly true if the sealants of the invention are employed on glass, particularly if the resultant seal to glass must meet the demanding specifications placed upon it by the automotive industry when the composition is employed as a windshield sealant, for example. Priming also improves bonding to metals, e.g., when the sealant-primer system is used as a metal-to-metal adhesive.

The primer component of the sealant-primer system of the present invention is an isocyanate-reactive surface primer composition consisting essentially of: (1) the reaction product of an aliphatic silane having an isocyanate-reactive group with an excess of an aliphatic polyisocyanate; (2) carbon black; (3) a film-forming resin; (4) an isocyanate-terminated isocyanurate prepared by reacting toluene diisocyanate and hexamethylene diisocyanate; and (5) a catalytic amount of a catalyst promoting isocyanate curing reactions.

The bond between the polyurethane sealant earlier described and glass or metal is improved by the use of a primer having affinity both for glass or metal and for the polyurethane polymer. Materials of this type include the silanes, for example. These compounds are generally of the formula $RSiR_1R_2R_3$, wherein R is an organic isocyanate-reactive group, and groups $R_1 - R_3$ may be water-inert or hydrolyzable groups but include at least one hydrolyzable group. Thus, certain of groups $R_1 - R_3$ of the silane may be water-inert lower alkyl groups. Other groups should be hydrolyzable groups, for example lower alkoxy groups such as methoxy or ethoxy groups, acyloxy groups such as acetoxy, or chloro groups. Commercially-available silanes of the type described above in which the group R contains an isocyanato-reactive group include compounds such as gamma-aminopropyl triethoxy silane, N-β(aminoethyl)-gamma-amino-β-methyl-propyl trimethoxy silane and gamma-mercapto propyl trimethoxy silane. It is believed that the amino or mercapto groups present in these compounds are reactive with the isocyanate group, while the alkoxy groups present bond readily to glass or metal, perhaps by hydrolytic reactions with water molecules at the glass of metal surface.

The polyurethane sealant component described earlier herein can be adhered to glass simply by first treating the glass with such a silane primer having an isocyanato reactive group. Those primers containing a mercapto group give bonds having better water resistance. However, bonds made to surfaces primed solely with such a silane have little resistance to ultraviolet light.

To increase the resistance of the bond to ultraviolet, carbon black is suitably incorporated into the primer. Because the silane primers are generally employed as dilute solutions in an organic solvent such as methanol, ethanol, isopropanol, mineral spirits, acetone, benzene, toluene, xylene, etc., a film forming resin binder is appropriately added to the solution to imrove dispersion of the carbon black therein and to prevent separation of the filler on drying. A variety of resins can be used as binders, including chlorinated rubber, polyvinyl chloride, and polyacrylate resins, but the best results have been obtained by using commercially available linear saturated polyester polymers having molecular weights between 20,000 and 30,000. These polymers are compatible with the isocyanate component of the primer, show little isocyanate reactivity, and have good stability.

The resulting primer compositions, if used with the polyurethane sealant component previously described herein, give a seal having a resistance to ultraviolet light (as measured in a twin carbon arc fadeometer at a black panel temperature of 190° F.) of about 25 hours.

The adhesion and ultraviolet resistance attributable to the use of a primer can be greatly increased by the further incorporation into the primer of an aliphatic and/or araliphatic isocyanate. According to the present invention, two such isocyanates — which can be employed alone or in combination in the primer compositions — include 2,6-diisocyanato methyl caproate (the methyl ester of lysine diisocyanate) and a commercially-available polyisocyanurate formed by condensing toluene diisocyanate and hexamethylene diisocyanate to give a product having an equivalent weight of about 370 and an isocyanate content of 11 – 12 percent, in which the isocyanates are bound by isocyanurate linkages, e.g., as shown below:

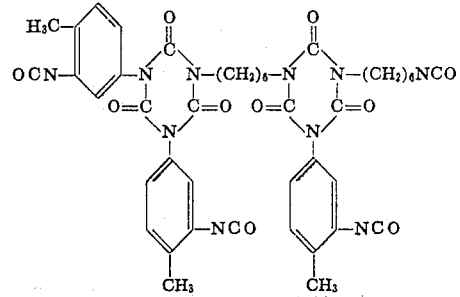

A combination of the lysine diisocyanate methyl ester and the polyisocyanate-isocyanurate just described gives a primer having excellent green tack with the polyurethane sealant earlier disclosed, and forms polyurethane seals whose resistance to ultraviolet, as measured under the fadeometer conditions earlier described herein, is at least 170 hours. When lysine diisocyanate alone is employed in a primer, adhesion of the polyurethane sealant thereto is relatively slow. If the polyisocyanate-cyanurate mentioned is used alone, the shelf stability of the primer is lessened.

A surprising and unexpected increase in the resistance of the primer compositions of the present invention to ultraviolet, e.g., to exposures of over 1,000 hours in a fadeometer is obtained by pre-reacting a portion of the primer polyisocyanate component with the isocyanate-reactive silane component. Such pre-reaction tends to eliminate any incompatibility after evaporation of the solvent vehicle from the primer. As a matter of production expedient, only so much isocyanate is employed as completely reacts with the silane. In primers containing both lysine diisocyanate methyl ester and the aforementioned polyisocyanate-isocyanurate, it is convenient to pre-react the silane with the lysine compound, since the latter generally is used in amounts smaller than those for the polyisocyanate-isocyanurate. For example, it has proved advantageous to react a silane containing a mercapto group with the methyl ester of lysine diisocyanate by heating the two materials (the diisocyanate being present in excess) at an elevated temperature for a period of several hours or until it is evident from the free isocyanate content of the reaction product that substantially all of the isocyanate-reactive groups of the silane have been reacted. The balance of the isocyanate component is then simply combined with the pre-reacted materials.

Finally, a catalytic amount of a catalyst for isocyanate curing reactions is suitably incorporated into the primer composition. As before, catalysts for isocyanate curing reactions are useful, e.g., heavy metal carboxylates, amines, etc. For a primer particularly suitable for glass and metal surfaces, an amine catalyst is incorporated into the composition. 1,2,4-trimethyl piperazine is preferred as the amine catalyst since its presence in the primer promotes quick adhesion to the polyurethane sealant component earlier described. The sealant-primer system will cure in the absence of a catalyst in the primer, but the reaction is slow and may be impractical or uneconomical, depending on the particular use in which the system is employed.

It is also advantageous to disperse a drying agent in the composition to maintain a low moisture content, and to dilute the composition with a dry inert volatile organic solvent to a consistency convenient for applying the primer composition to a surface. Suitable drying agents are non-reactive with isocyanate groups, for example, the zeolites, silica gel, barium oxide, calcium oxide, the so-called "molecular sieves," and the like. Suitable solvents include methyl ethyl ketone, toluene, ethyl acetate, etc.

In compounding a primer composition like that just described, from 2 – 4 parts by weight of silane are suitably combined with an excess of aliphatic isocyanate, e.g., 3 – 10 parts of lysine diisocyanate methyl ester, in the presence of 0.0001 to 0.001 part of a catalyst such as stannous octoate.

This pre-reacted material is then combined, in amounts from 5 – 15 percent by weight of the entire primer composition, with 3 – 10 percent of a polyester resin. The polyester is conveniently added in a solvent such as toluene or ethyl acetate which is from 7 – 20 percent of the weight of the primer composition. From 6 – 12 percent, by weight of the entire primer, of a polyisocyanate-isocyanurate compound are added, again conveniently in a solvent such as cellosolve acetate or xylene in amounts which contribute from 4 to 8 percent by weight of the total primer composition. Up to 10 percent by weight of a drying agent, from 2 to 20 percent by weight of a filler such as carbon black, from 0.01 – 3 percent of a catalyst such as 1,2,4-trimethyl piperazine, and from about 20 to 55 percent of additional solvent are used to complete the primer formulation.

When the primer compositions described just above are employed in combination with a polyurethane sealant, the primer is first applied to the surface, such as glass or metal, to be primed. The primer is suitably applied in amounts to give a dry film thickness between 0.5 mil and 10 mils, preferably between 2 to 5 mils. As noted earlier, the primers described herein are particularly quick-drying and the polyurethane sealant to be used therewith can generally be applied to the primed surface within a few minutes after priming. The sealant is then applied to the primed surface and curing occurs rapidly with the production of seals having excellent strength and other properties.

A better understanding of the present invention and of its many advantages will be had by referring to the following specific Examples given by way of illustration.

EXAMPLE 1

A polyurethane polymer for incorporation into a polyurethane sealant composition was prepared as follows.

106.9 pounds of diphenylmethane-4,4'-diisocyanate, pre-heated to a temperature of about 120° F., were introduced into a jacketed reactor under nitrogen. 415.7 pounds of a polypropylene ether diol having an average molecular weight of about 2,000 and commercially available under the tradename "Pluracol P 2020" were added. The mixture was heated to 180°F. until the mixture was substantially free of hydroxy groups but contained about 3.5 percent by weight of unreacted isocyanate groups, based on the total weight of the reaction product.

The mixture was then cooled to 120° F. and 189.9 pounds of a polypropylene ether triol, commercially available under the tradename "TPE-4542," formed by the addition of propylene oxide to trimethylol propane (terminated by reaction with ethylene oxide), and having a molecular weight of 4,200 to 4,800, were added. 285 pounds of chlorinated biphenyl having a chlorine content of 42 percent by weight, available under the tradename "Aroclor 1242," were also added. Finally, 25 grams of stannous octoate as a catalyst were admixed. The temperature of the mixture was brought to 140° F. and reacted until the free isocyanate content of the resulting cross-linked material was 1.3 percent. The mixture was then cooled to 90° F. and 2.5 pounds of diethyl malonate were then added to block the residual free isocyanate groups.

647.94 pounds of this blocked prepolymer were then introduced into a compounding mixer under a vacuum of 28 inches of mercury. The vacuum was broken under nitrogen to introduce 186.15 pounds of dry furnace black and 132.3 pounds of dry thermal black. 2.75 pounds of additional diethyl malonate were incorporated into this mixture under nitrogen, together with 27.49 pounds of toluene and 3.37 pounds of di(phenylmercuric)dodecenyl succinate as a 21 percent by weight solution in high-flash naphtha. The mixture was then blended to a homogeneous consistency and discharged into containers under nitrogen. The containers were then sealed to be moisture-proof.

EXAMPLE 2

A primer suitable for use with the polyurethane composition of Example 1 in forming bonds to glass was prepared as follows.

106 pounds of lysine diisocyanate methyl ester (one equivalent) were added to a reaction vessel purged with nitrogen and heated to 160° F. Stannous octoate was introduced as a catalyst in an amount of 4.4 grams.

68.6 grams (0.35 equivalent) of gamma-mercapto propyl trimethoxy silane commercially available under the tradename "A-189 silane" were added to the heated diisocyanate over a period of 1/2 hour, with care that the exothermic reaction did not raise the temperature above about 200° – 210° F. After the addition was completed, the mixture was heated for 1 ½ hours at 180° F., after which the free isocynate content of the reaction mixture was tested. If substantially all of the silane had not reacted, heating was continued at 180° F. for another 1/2 hour or till such a time as the isocyanate content was reduced to a point showing complete reaction of the silane.

In another vessel, 330 pounds of a linear saturated polyester polymer commercially available under the tradename "Vitel 200" and having a molecular weight between 20,000 – 25,000 and an acid number of 1.68 were mixed in a container under nitrogen with 335 pounds of dry toluene and 335 pounds of ethyl acetate. The mixture was agitated until the polyester was completely dissolved. The resulting solution had a solids content of 33 percent.

222.26 pounds of this polyester solution, 154.34 pounds of an aliphatic polyisocyanate formed by reacting toluene diisocyanate and hexamethylene diisocyanate (commercially available under the tradenames "E-26" or "Desmodur HL"), and 84.37 pounds of the lysine diisocyanate methyl ester mercapto silane reaction product earlier described were added under nitrogen with 231.51 pounds of dry methyl-ethyl ketone into a pebble mill. After rotating the mill for a few turns to mix the ingredients, 51.54 grams of a zeolite drying agent commercially available as "Molecular sieves 3A" and 102.89 pounds of dry carbon black were introduced.

The resulting combination was milled for 16 hours. 4.24 pounds of 1,2,4-trimethyl piperazine (as a catalyst for isocyanate curing reactions), and an additional 148.94 pounds of dry methyl-ethyl ketone were then introduced. The resulting mixture was milled for an additional 1/2 hour and filled into containers under nitrogen. The containers were sealed to be moisture-proof. The finished product has a solids content of about 44 percent.

EXAMPLE 3

A glass surface and a painted metal surface were bonded as follows using the sealant-primer system of the present invention. A glass panel 4 inches square was coated with the primer composition of Example 2 along a center strip 1 inch wide. A 1/4 inch bead of the sealant of Example 2 was laid down in the center of this strip, so that the sealant and primer were in contact over an area of 1 square inch (1/4 inch × 4 inch). A painted metal panel 4 inches × 4 inches was applied over the sealant bead.

The resulting laminate had a tensile strength of more than 40 psi after 6 hours.

EXAMPLE 4

A strip 1 inch wide along one side of a 4 inches × 4 inches glass panel was primed with the primer of Example 2. A 1/2 inch bead of sealant was laid down on top of the primer. Painted metal strips 1/2 inch wide and 4 inches long were next embedded in the sealant, with their long axis perpendicular to the sealant bead, so that a bond 1/4-sq. inch in area (1/2 inch × 1/2 inch) was formed under each strip. The metal strips were torn off by shearing forces at different times. After 6 hours, the shear strength of the bond exceeded 60 psi.

What is claimed is:

1. A cured rubbery polyurethane seal prepared by: (A) priming a surface exposed to ambient atmospheric moisture with an isocyanate-reactive surface primer composition comprising (1) 5 – 15 percent of the reaction product of an aliphatic silane having an isocyanate-reactive group with an excess of lysine diisocyanate methyl ester; (2) 2 – 20 percent of carbon black; (3) 3 – 10 percent of a film-forming polymeric resin binder selected from the group consisting of chlorinated rubber, polyvinyl chloride, polyacrylate resins, and polyester resins; (4) 6 – 12 percent of a condensation product of toluene diisocyanate and hexamethylene diisocyanate having an equivalent weight of about 370 and an isocyanate content of about 11 – 12 percent by weight of said condensation product; (5) 0.01 – 3 percent of a catalyst for isocyanate curing reactions; and an organic solvent vehicle for these enumerated ingredients, the percentages being percentages by weight of the entire composition; (B) drying the primer; (C) applying thereover a sealant composition comprising (1) a cross-linked polyurethane polymer having terminal isocyanate groups blocked to inhibit allophanate formation, said polymer being the reaction product of a polyalkylene ether diol and a polyalkylene ether triol with an excess amount of a diisocyanate having equivalent isocyanate groups to form a cross-linked polyurethane polymer having free isocyanate groups which are then reacted with an excess of a blocking agent, volatile at room temperature, to form water-labile terminal groups; (2) 0.01 – 3 parts of a catalyst promoting isocyanate curing reactions; (3) up to 135 parts of an inert filler; (4) up to 20 parts of a plasticizer; and (5) up to 20 parts of an organic solvent, said parts being parts by weight per 100 parts of the polyurethane polymer component and said filler, plasticizer, and solvent being present, within the ranges specified, in amounts imparting desired rheological properties to said compositions; (D) curing the sealant by exposure to atmospheric moisture.

2. A cured rubbery polyurethane seal as in claim 1 wherein said filler is carbon black and wherein said polyurethane polymer (C)(1) is prepared by reacting a polyalkylene ether diol having a molecular weight from 1,500 to 3,000 with an excess of diphenyl methane-4,4'-diisocyanate to form a product containing from about 3 to 4 percent by weight of free isocyanate groups, reacting this product with a polyalkylene ether triol having a molecular weight from 3,500 to 5,500 to give a product containing from about 1 to 2 percent by weight of free isocyanate groups, and then reacting this product with an excess of a dialkyl malonate.

* * * * *